July 6, 1948.  J. G. SNIP  2,444,683
APPARATUS FOR OPERATING TWO OARS WITH ONE HAND
Filed Jan. 7, 1947  2 Sheets-Sheet 1
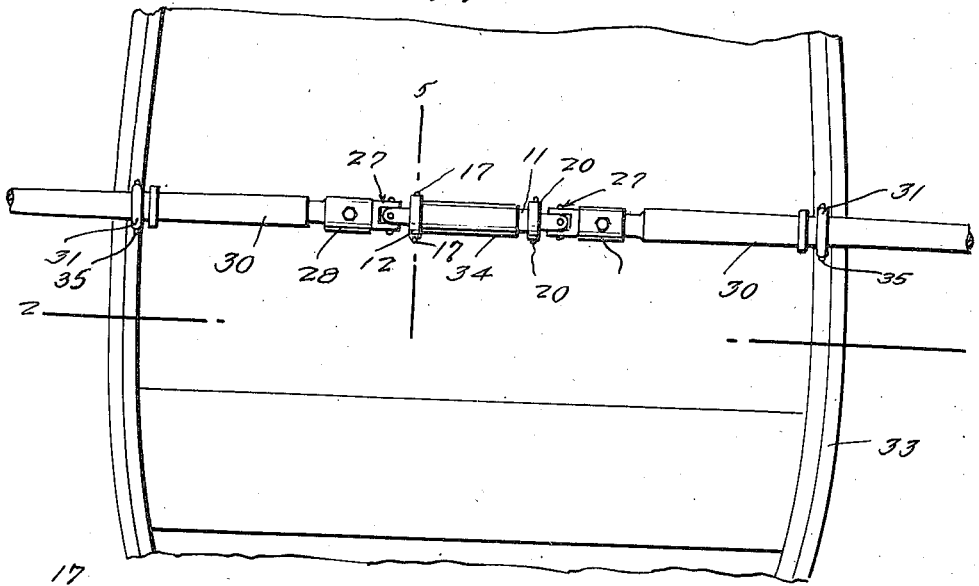
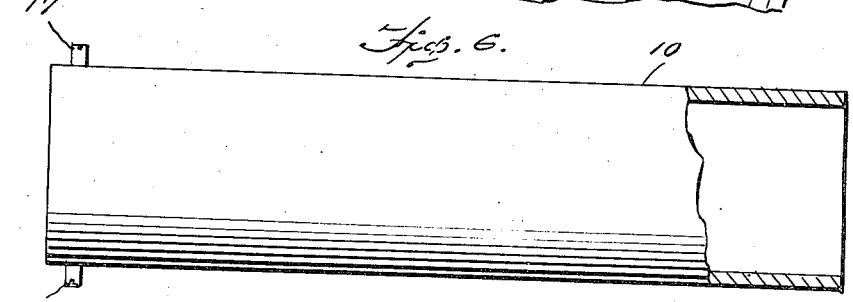
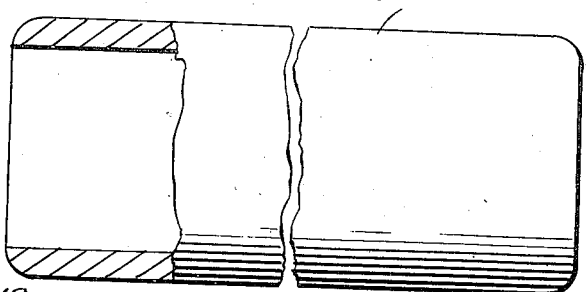
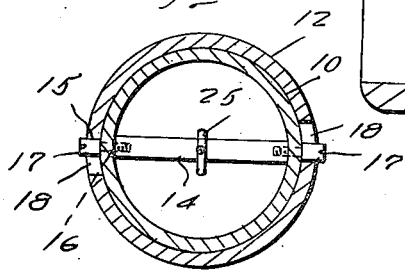
Inventor
John G. Snip
By
McMorrow, Berman and Davidson
Attorneys July 6, 1948. J. G. SNIP 2,444,683
APPARATUS FOR OPERATING TWO OARS WITH ONE HAND
Filed Jan. 7, 1947 2 Sheets-Sheet 2

Inventor
John G. Snip
By McMorrow, Berman & Davidson
Attorneys

Patented July 6, 1948

2,444,683

UNITED STATES PATENT OFFICE 2,444,683

APPARATUS FOR OPERATING TWO OARS WITH ONE HAND

John G. Snip, Lamar, Mo.

Application January 7, 1947, Serial No. 720,576

6 Claims. (Cl. 9—24)

My invention refers to sportsmen's goods, and more particularly to oars.

The object of my invention is to provide an apparatus or a device enabling a person to operate a rowboat by two oars by using one hand only, permitting a fisherman to fish by casting, etc., while propelling and manipulating the boat with two oars.

Another object of my invention is to provide a device of the character indicated above adapted to be used for the purpose of learning the use of two oars in unison.

Other objects of my invention may appear in the following specification describing my invention with reference to the accompanying drawings illustrating a preferred embodiment of my invention.

It is, however, to be understood that my invention is not to be limited and restricted to the exact construction and combination of parts described in the specification and shown in the drawings, but that such changes and modifications can be made which fall within the scope of the claims appended hereto.

In the drawings,

Figure 1 is a fragmentary top plan view of a row boat equipped with two oars connected with each other by the device forming the subject matter of my invention.

Figure 5 is a sectional view taken on line 5—5 in Figure 1 and shown in a larger scale.

Figure 6 is an elevational detail side view of the outer tubular member used in constructing the device according to my invention, partly shown in section.

Figure 7 is a fragmentary elevational side view of a tubular hand-grip forming a part of the device according to my invention, partly shown in section.

Figure 2:
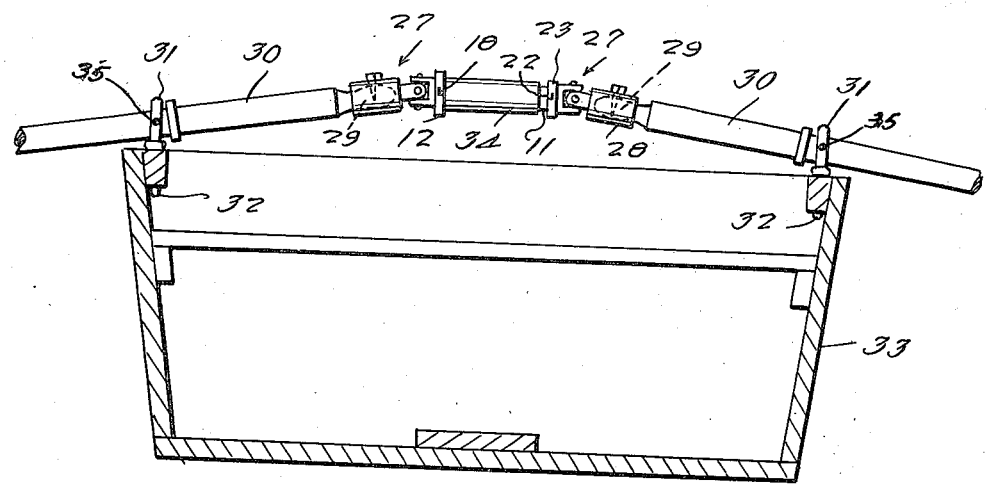
Figure 2 is a vertical cross-sectional view taken on line 2—2 in Figure 1.
Figure 3:
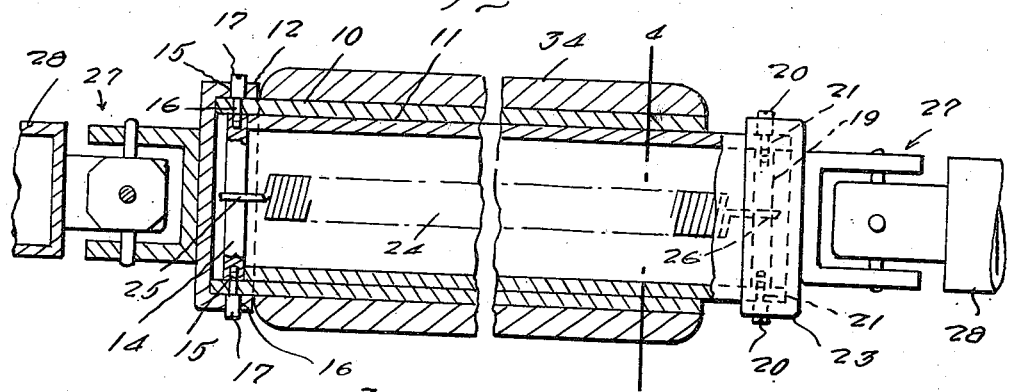
Figure 3 is a longitudinal sectional view of the device according to my invention shown in a larger scale.
Figure 4:
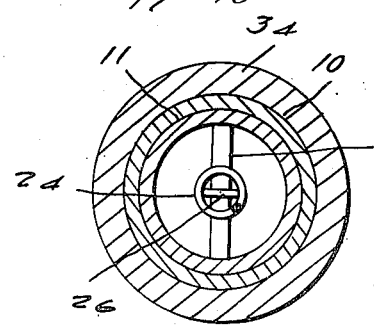
Figure 4 is a sectional view taken on line 4—4 in Figure 3.

Referring now in detail to the drawings, the device forming the subject matter of my invention comprises an outer tubular member 10, inside of which an inner tubular member 11 is arranged slidably or telescopically.

On one end of the outer tubular member 10 a cap 12 is arranged in a manner described later.

Adjacent the capped end of the outer tubular member 10, a round bar 14 is located and extends diametrically thereto. Each end of this bar 14 is provided with an axially extending female thread 15 adapted to receive threadedly a fillister head screw 16 extending through the outer tubular member 10 and having a head 17 which is higher than the standard fillister head. The cap 12 is provided in its circumferential wall with two bayonet-slots 18 arranged diametrically opposite to each other, and adapted to receive the fillister heads 17 therein to secure the cap 12 on the outer tubular member 10.

It is, however, to be understood that countersunk screws may be used to secure the bar 14 in the outer tubular member 10 and that the cap 12 can be attached to the tubular member 10 by welding or the like, or that the cap 12 may be secured threadedly on the tubular member.

In the outer end of the inner tubular member 11, a second round rod 19 is arranged and secured in the same manner as described above for the first round rod 14, and the fillister heads 20 of the screws 21 securing the second round rod 19 in position are adapted to engage two bayonet slots 22 provided diametrically opposite to each other in the circumferential wall of a cap 23 arranged on the outer end of the inner tubular member 11.

A helical spring 24 is located inside the two tubular members 10 and 11 and the ends 25 and 26 of this helical spring are secured to the round bars 14 and 19 respectively, pulling them toward each other and urging the two tubular members 10 and 11 to remain in collapsed telescopical position.

To the outside end of each of the caps 12 and 23 a universal joint construction 27 is secured carrying a hollow cylindrical member 28 adapted to receive the hand end 29 of an oar 30 which can be secured therein in any desired conventional manner.

Each oar stem is pivotally mounted on a pin 35 extending horizontally through the head 31 of a thole pin 32 rotatably supported by the gunwale of a row boat 33.

A tubular hand grip 34 is slidably arranged outside of the outer tubular member 10 to eliminate the friction on the palm of a hand caused by manipulating the above described rowing apparatus.

The above description shows clearly that the two oars can be operated by one hand gripping the hand hold 34, leaving the other free for still fishing, trolling, casting, or the like.

Attention is called to the fact that the universal joint constructions 27 shown in the drawings and mentioned as connecting the cylindrical member 28 with the caps 12 and 23 may be replaced by a ball and socket joint, flexible rubber connections, or the like.

Having described my invention, I claim as new and desire to secure by Letters Patent:

1. A device for operating two oars of a row boat with one hand including a hand-grip, universal joints on both ends of the hand-grip, and means for connecting the hand end of an oar to each universal joint, the hand-grip comprising two tubular members arranged telescopically in each other.

2. A device for operating two oars of a row boat with one hand including a hand-grip, universal joints on both ends of the hand-grip, and means for connecting the hand end of an oar to each universal joint, the hand-grip comprising two tubular members arranged telescopically in each other, a bar in each tubular member extending diametrically thereof and arranged adjacent its outer end, and a helical spring extending through said tubular members and secured to the two bars.

3. A device for operating two oars of a row boat with one hand including a hand-grip, universal joints on both ends of the hand-grip, and means for connecting the hand end of an oar to each universal joint, the hand-grip comprising two tubular members arranged telescopically in each other, a bar in each tubular member extending diametrically thereof and arranged adjacent its outer end, and a helical spring extending through said tubular members and secured to the two bars, a cap secured to the outer end of each tubular member and the universal joint or the like attached to the outer end of each cap.

4. A device for operating two oars of a row boat with one hand including a hand-grip, universal joints on both ends of the hand-grip, and means for connecting the hand end of an oar to each universal joint, the hand-grip comprising two tubular members arranged telescopically in each other, a bar in each tubular member extending diametrically thereof and arranged adjacent its outer end, and a helical spring extending through said tubular members and secured to the two bars, a cap secured to the outer end of each tubular member and the universal joint or the like attached to the outer end of each cap and a cylindrical member on each universal joint or the like adapted to receive and hold the hand end of an oar.

5. A device for operating two oars of a row boat with one hand including a hand-grip, universal joints on both ends of the hand-grip, and means for connecting the hand end of an oar to each universal joint, the hand-grip comprising two tubular members arranged telescopically in each other, a bar in each tubular member extending diametrically thereof and arranged adjacent its outer end, a helical spring extending through said tubular members and secured to the two bars, a cap secured to the outer end of each tubular member and the universal joint or the like attached to the outer end of each cap and a cylindrical member on each universal joint or the like adapted to receive and hold the hand end of an oar which is movably arranged in the annular head of a thole pin rotatably mounted on a row boat.

6. A device for operating two oars of a row boat with one hand including a hand-grip, universal joints on both ends of the hand-grip, and means for connecting the hand end of an oar to each universal joint, the hand-grip comprising two tubular members arranged telescopically in each other, a bar in each tubular member extending diametrically thereof and arranged adjacent its outer end, a helical spring extending through said tubular members and secured to the two bars, a cap secured to the outer end of each tubular member and the universal joint or the like attached to the outer end of each cap and a cylindrical member on each universal joint or the like adapted to receive and hold the hand end of an oar which is movably arranged in the annular head of a thole pin rotatably mounted on a row boat and a tubular hand hold slidably surrounding the outer tubular member.

JOHN G. SNIP.

REFERENCES CITED

The following references are of record in the file of this patent:

UNITED STATES PATENTS

| Number | Name | Date |
| --- | --- | --- |
| 2,033,637 | Kaiser | Mar. 10, 1936 |

FOREIGN PATENTS

| Number | Country | Date |
| --- | --- | --- |
| 143,064 | Germany | Aug. 8, 1903 |
| 235,412 | Germany | June 13, 1913 |